Dec. 27, 1927.
H. E. SHREEVE
Re. 16,835
SIGNALING SYSTEM
Original Filed Sept. 17, 1918 2 Sheets-Sheet 1
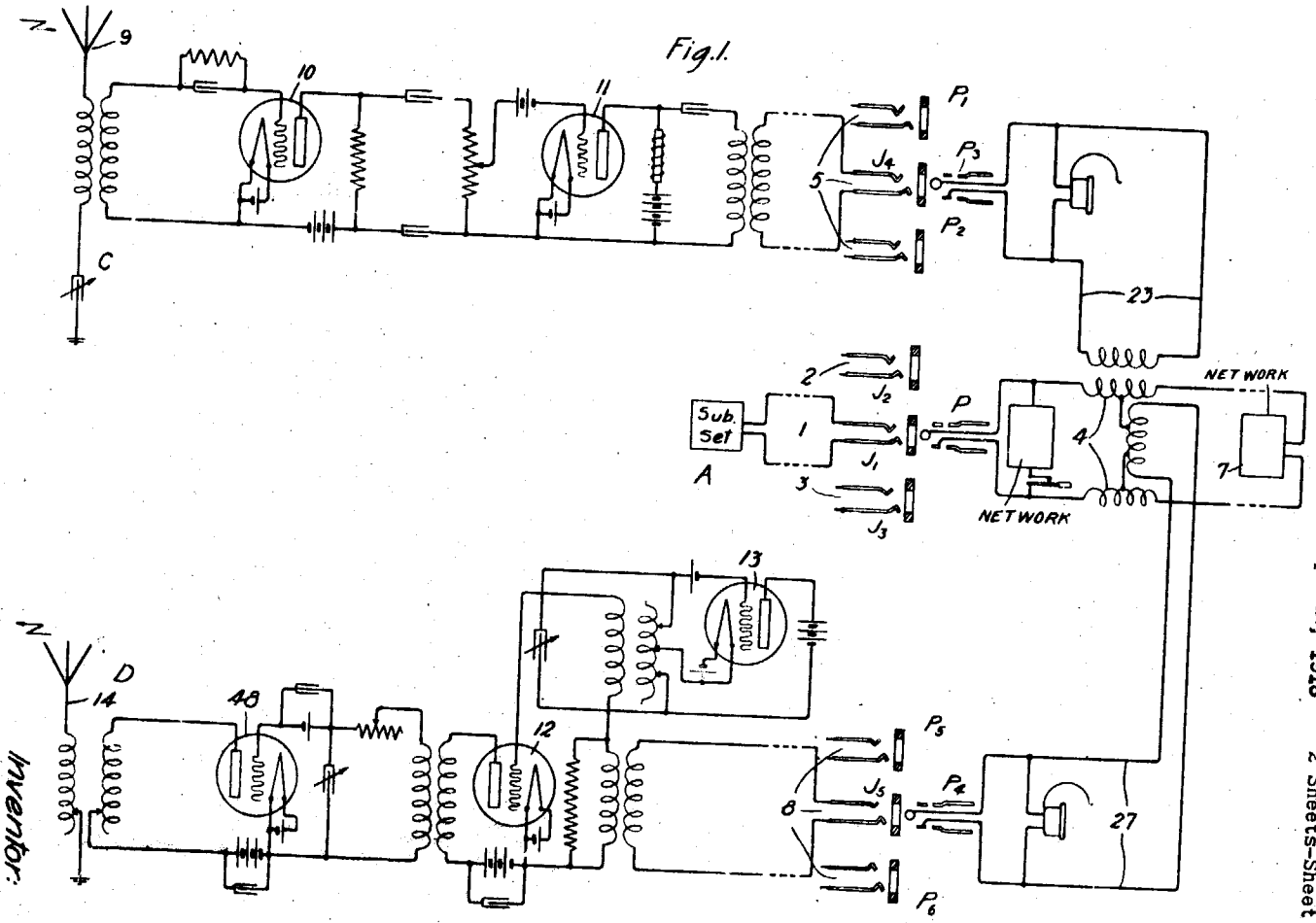
Inventor:
Herbert E. Shreeve
by J. G. Roberts
Att'y.

Dec. 27, 1927.
Re. 16,835
H. E. SHREEVE
SIGNALING SYSTEM
Original Filed Sept. 17, 1918 2 Sheets-Sheet 2
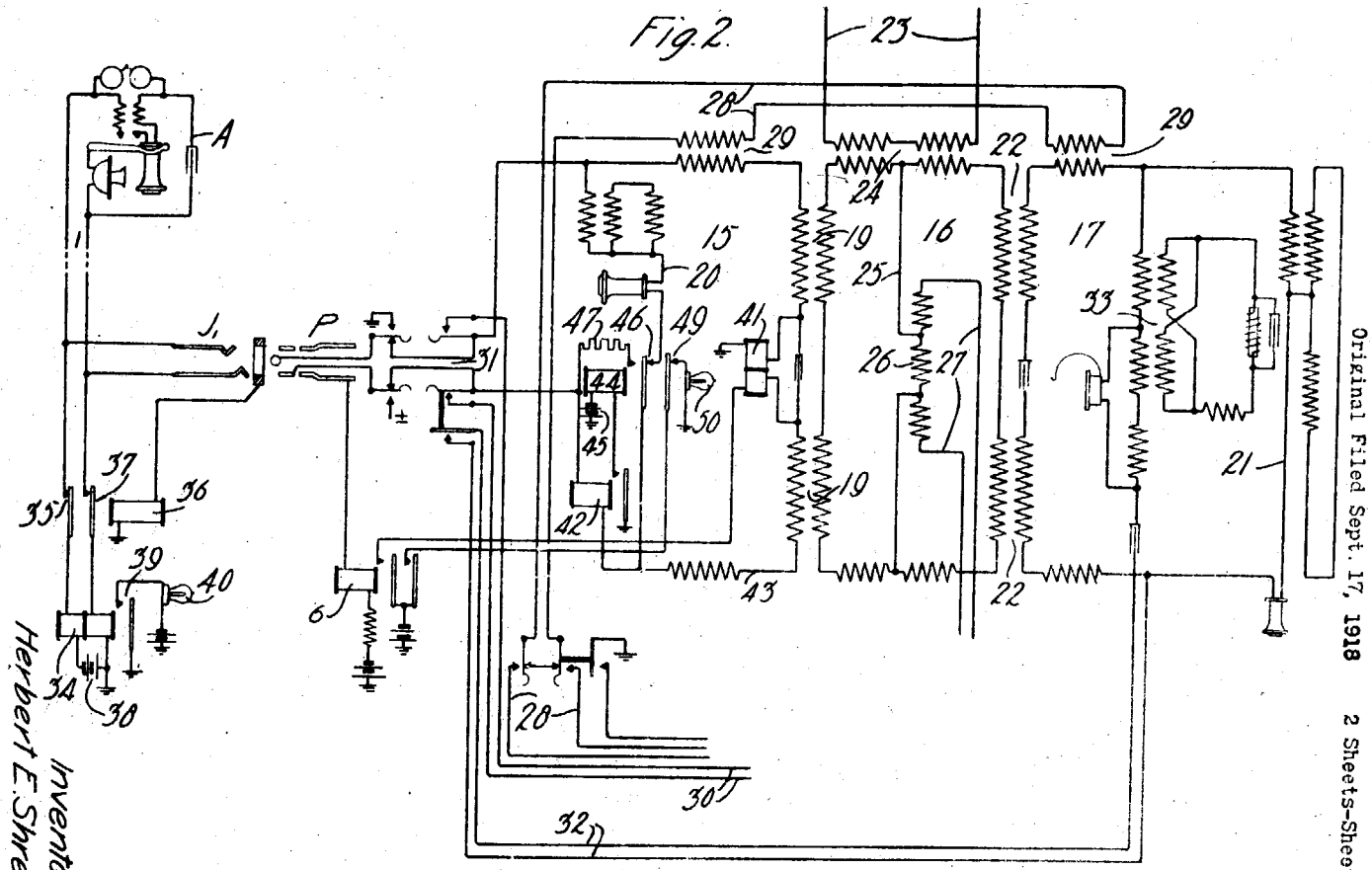
Inventor:
Herbert E. Shreeve.
by J. G. Roberts Atty.

Reissued Dec. 27, 1927. Re. 16,835

UNITED STATES PATENT OFFICE.

HERBERT E. SHREEVE, OF WYOMING, NEW JERSEY, ASSIGNOR TO AMERICAN TELEPHONE AND TELEGRAPH COMPANY, A CORPORATION OF NEW YORK.

SIGNALING SYSTEM.

Original No. 1,378,982, dated May 24, 1921, Serial No. 254,480½, filed September 17, 1918. Application for reissue filed May 21, 1923. Serial No. 640,593.

This invention relates to signaling systems, and more particularly to combined wire and radio signaling systems.

An object of the invention is to provide a signaling system for connecting two separated stations by asymmetric channels.

Another object of the invention is to provide a telephone system for connecting two subscribers' stations by combined wire and radio links.

A further object of the invention is to provide a central station with means for connecting an incoming signaling line to radio transmitting and receiving stations.

A still further object of the invention is to provide means at a central station whereby a two-wire telephone circuit may be simultaneously connected to one two-wire transmitting circuit leading to a radio transmitting station, and another two-wire receiving circuit leading from a radio receiving station.

An additional object of the invention is to provide at a central station connecting a telephone subscriber's station to radio transmitting and receiving stations, means for keeping the electrical characteristics of the central station and its associated apparatus balanced with respect to the connections to the radio stations.

In the drawing, Figure 1 illustrates diagrammatically the general scheme of signaling circuits between a telephone subscriber's set and a radio transmitting station and radio receiving station; Fig. 2 illustrates a scheme of cord circuits at the central station.

Referring to Fig. 1 of the drawing, the signaling station A is connected by a two-wire two-way transmission circuit 1 to a central station B at which the two-way transmission circuit is connected to two two-wire one-way transmission circuits, the incoming or listening circuit leading from a radio receiving station C and an outgoing or talking circuit leading to a radio transmission station D. Station A is represented diagrammatically in the drawing as a telephone subscriber's station, but obviously it may be an ordinary manual or printing telegraph station, or in fact, any other form of electric signaling device or selecting apparatus. Station A is one of a number of similar stations, each of which is connected by two-way transmission circuits 1, 2, 3, respectively, to jacks $J_1$, $J_2$, $J_3$ at the central station. The cord circuit included at the central station terminates in a plug P which serves to connect the subscriber to the operator's circuit having a series winding 4 to which the incoming one-way transmission line 5 is inductively connected, and a shunt winding conjugately related to the series winding and across which the outgoing one-way transmission line 8 is connected. A balancing network at the central station to simulate the impedance of lines 1, 2, 3 and their connected apparatus is indicated generally by element 7. $P_1$, $P_2$, $P_3$, $J_4$ and $P_4$, $P_5$, $P_6$, $J_5$ are conventional plug and jack arrangements for connecting the incoming lines 5 and the outgoing lines 8 to the central station circuit.

Radio receiving station C comprises an antenna 9, a detector 10, preferably of the vacuum tube type, and an amplifier 11, which may also be of the vacuum tube type, having an output circuit connected to line 5 to which it supplies detected or audio frequency currents in the well-known manner.

Radio transmitting station D comprises a modulator 12 of the vacuum tube type to the input circuit of which a vacuum tube oscillator 13 and a transmission circuit 8 are inductively connected, the output circuit of the modulator 12 serving to supply modulated oscillations to the input circuit of vacuum tube amplifier 48 which connects modulator 12 to transmitting antenna 14.

As will be clear from the description of Fig. 1, signal variations originating at station A produce corresponding variations in line 8 to which station A is connected by the central station circuit. Signal currents from line 8 and radio frequency oscillations from oscillator 13 are supplied to modulator 12 by which modulated oscillations of radio frequency are transmitted to amplifier 48. Amplified modulated oscillations are impressed upon antenna 14 and their energy is radiated in the ordinary manner. Amplifier 48 and modulator 12 are asymmetrically conducting and consequently no signals will be transmitted in over lines 8 when oscillations are set up in antenna 14 by radiant energy from another source. Radiant electrical energy from a distant station if of proper frequency, will set up electrical oscillations in receiving antenna 9 and these high frequency oscillations are supplied to detector 10, which in turn supplies detected or audio frequency signaling currents to the line or channel 5 through amplifier 11. These signaling currents traverse line 5 and connected line 1 and produce signal indications at station A. Detector 10 and amplifier 11 are asymmetrically conducting; line 5 serves therefore as a channel for incoming signals. It should be noted, however, that since the incoming and outgoing channels are conjugately related at station B, there is no tendency for energy transmitted from station D to be received at station C and cause singing of the radio circuits even when antennæ 9 and 14 are both tuned to the frequency of the oscillations generated by oscillator 13. From one point of view, two-way signaling is carried on over a single wire channel from station A to station B; over two two-wire one-way channels from station B to stations C and D; and by two radio channels to the distant signaling station which, as in the case of transatlantic communication, may be connected to a system similar to that illustrated in Fig. 1. It will of course be understood that there may be as many stations C for receiving and as many stations D for transmitting radio messages as desired and that any station C may be used with any station D regardless of their locations.

Referring to Fig. 2, which shows the cord circuits at the central station, a single signal station A, shown by way of example as an ordinary telephone subscriber's station, is connected by line 1, which may contain any number of toll lines and repeating stations, to the jack $J_1$ at the central station B. The circuits at station B consist of three sections 15, 16 and 17 which may be respectively termed the line section, the repeating section and the artificial line or balancing section, and are so designed as to automatically balance, whether the subscriber's line and associated apparatus and the operator's set are connected or disconnected. Section 15 terminates in the tip and ring contacts of plug P and is inductively related to repeating section 16 by repeating coils 19. Normally, when plug P is disconnected from a jack, section 15 balances section 17. A conductor 20 containing an artificial impedance simulating the impedance of subscriber's station A and its transmission circuit 1 is normally bridged across section 15 and a corresponding impedance conductor 21 is bridged across section 17 which is connected to repeating section 16 by coils 22. The character and value of the impedances used in conductors 20 and 21 depend upon the characteristics of the line 1 which is to be balanced. Incoming currents from the radio receiving station traverse line 5, jack $J_4$, plug $P_3$, circuit 23, and are repeated over coils 24 to section 16. Connected in conjugate relationship to the windings of coil 24 is a bridge 25, including auto-transformer 26 across which the outgoing circuit 27 leading to the radio transmitting station is connected. The operator's listening circuit 28 is inductively related to sections 15 and 17 by similar transformers 29 and so does not disturb the balance of the two sections and their connected circuits. The operator's talking circuit 30 may be connected across section 15 by means of key 31 and the same operation of the key closes circuit 32 bridged across section 17 and containing an artificial operator's talking circuit designated generally by numeral 33, this artificial circuit serving to balance circuit 30 and its connected apparatus.

Upon removing the receiver from its switchhook, the subscriber at station A closes the usual circuit from battery through one winding of line relay 34, back contact 35 of cut-off relay 36, over line 1 and back through front contact 37 of cut-off relay 36, a second winding of line relay 34 and battery 38. Line relay 34 is energized, closing a circuit at contact 39 and causing the energization of signal device 40. The operator observing the energized condition of signal device 40 inserts plug P into the corresponding jack $J_1$, completing an energizing circuit for cut-off relay 36 which may be traced from ground through winding of relay 36 to sleeve contacts of jack $J_1$ and plug P, winding of relay 6, and battery to ground. In its operation, cut-off relay 36 pulls up both its armatures 35 and 37, permitting signal element 40 to be deenergized. Relay 6 is also energized and pulls up both its front and back armatures. Another circuit which is closed may be traced from ground, upper winding of core 41, coil 19, winding of transformer 29, tip contacts of plug P and jack $J_1$ over the line 1 and back through ring contacts of plug P and jack $J_1$, winding of answering supervisory relay 42, conductor 43, lower winding of core 41, through the front contact of relay 6 and its armature, to ground. Relay 42 is now energized and completes a circuit from ground through its armature and front contact, winding of relay 44 and battery 45 to ground. Relay 44 in energizing, pulls up armature 49 opening the circuit through answering supervisory lamp 50 which was momentarily closed by the back armature of relay 6. Relay 44 moves the armature 46 from its back contact to the front contact, thereby opening the bridge circuit 20 and closing the talking current path through non-inductive resistance 47 in shunt to the winding of relay 42. The impedance characteristic of circuit 20 should be as nearly as possible that of circuit 1 and its connected apparatus. The operator in effect cuts circuit 20 off the line and substitutes therefor an equivalent impedance without disturbing the impedance balance of section 15 against section 17. If now the operator closes her talking key 31 so as to bridge circuit 30 across line section 15, circuit 32 is simultaneously closed, throwing an equivalent impedance across section 17. The act of restoring key 31 cuts off both circuits 30 and 32 and the removal of plug P from jack $J_1$ restores all circuits to their original condition. It will be apparent that sections 15 and 17 are thus kept balanced at all times. Incoming signal currents are repeated from circuit 23 through coil 24 to section 16, and outgoing signal currents are impressed from line 1 through repeating coils 19 upon section 16 and circuit 27 which is bridged thereacross. Circuits 23 and 27 which connect the high frequency apparatus to the central station, are in effect radio trunks or toll lines by which one subscriber may communicate with another.

Although circuits 23 and 27 have been described in connection with radio signaling receiving and transmitting systems respectively, it is obvious that any signaling circuit comprising two one-way circuits constituting electrically independent incoming and outgoing channels may be connected by circuits such as disclosed herein to an ordinary two-wire signaling line. In the case of radio transmission, the particular radio apparatus disclosed may be replaced by any other suitable radio transmitting and receiving apparatus. The system disclosed may equally well be applied to other forms of electric signaling and to electric selecting systems. The invention is therefore not to be limited to the arrangement disclosed, but only by the scope of the appended claims.

What is claimed is:

1. In combination, means for receiving radio signal waves and for detecting said waves, a central station, an asymmetric receiving channel connected to said detecting means and terminating at said central station, independent means for transmitting radio signal waves modified in accordance with signals, an asymmetric transmitting channel connected to said independent means and terminating at said central station, a two-way signal line terminating at said central station and means at said central station for connecting said signal line to said transmitting channel and said receiving channel at will.

2. In combination, means for receiving and detecting carrier waves, a central station, an asymmetric receiving channel connected to said means and terminating at said station, independent means for transmitting carrier waves modified in accordance with signals, an asymmetric transmitting channel connected to said independent means and terminating at said central station, a two-way signal line terminating at said central station, and a cord circuit for conjugately connecting said channels to said signal line at will.

3. A signaling system comprising a transmitting station, a receiving station, a subscriber's station, and a central station connected by independent circuits to each of the aforesaid stations, the circuits leading to said transmitting and said receiving stations being asymmetrically conducting.

4. In a signaling system, a plurality of electrically independent asymmetric channels, a two-wire circuit, and means for connecting said two-wire circuit to any two of said channels which are oppositely directed.

5. In a signaling system, two asymmetric signaling channels, a two-wire circuit, a central station for connecting said channels to said circuit, and means at said central station disconnected when said circuit is connected for simulating the impedance of said circuit and its associated apparatus.

6. In a signaling system, two asymmetric signaling channels, a two-wire circuit, a central station for connecting said channels to said circuit, said station comprising a repeating section in which said two signaling channels are conjugately connected, a line section connected to said repeating section, and a balancing section simulating the impedance of said line section and connected to said repeating section in such manner as to balance said line section.

7. In a signaling system, two asymmetric signaling channels, a two-wire circuit and a central station for connecting said channels to said circuit, said station comprising a repeating section in which said two signaling channels are conjugately connected, a line section connected to said repeating section, and a balancing section simulating the impedance of said line section and connected to said repeating section in such manner as to balance said line section, said station also comprising means disconnected when said circuit is connected for simulating the impedance of said circuit and its associated apparatus.

8. In a signaling system, two asymmetric signaling channels, a two-wire circuit, a central station for connecting said channels to said circuit, means at said central station disconnected when said circuit is connected for simulating the impedance of said circuit and its associated apparatus, an operator's set for the central station operator, means for connecting said set to said circuit, and an artificial operator's set controlled by said connecting means to automatically maintain the circuit balance at said central station.

9. In a signaling system, two asymmetric signaling channels, a two-wire circuit, and a central station for connecting said signaling channels to said circuit, said central station comprising means for simulating the impedance of said two-wire circuit to balance the circuits at said central station with respect to said signaling channels, an operator's set for the central station operator, means for connecting said set to said two-wire circuit, and an artificial operator's set controlled by said connecting means to automatically maintain the circuit balance at said central station.

10. In combination, a plurality of asymmetric incoming channels, a plurality of asymmetric outgoing channels, a plurality of subscribers' lines, a central station and means whereby an operator at said central station may connect any of said subscribers' lines to any of said outgoing channels and any of said incoming channels.

11. A wireless telephone system comprising a transmitting antenna, a receiving antenna, an operator's station, a subscriber's line terminating at said station, independent asymmetric channels connected to said antennæ and terminating at said station, and means at said station comprising cord circuits for conjugately connecting said channels to said line at will.

12. A signaling system comprising a plurality of radio transmitting stations, a plurality of radio receiving stations and a plurality of signaling stations, and means for connecting said signaling stations to any one of said transmitting stations and any one of said receiving stations.

13. In combination, a central station, a subscriber's station, a two-way signaling circuit connecting said subscriber's station to said central station, a plurality of one-way carrier channels terminating at said central station, and a cord circuit at said central station having a two-wire termination and a four-wire termination for connecting said two-way circuit to two of said carrier channels.

14. A telephone system comprising a high frequency incoming channel, a high frequency outgoing channel normally physically disconnected therefrom, a plurality of subscribers' lines, and operators' cord circuits for connecting said channels to any one of said lines at will.

15. A telephone system comprising a high frequency incoming channel, a high frequency outgoing channel normally physically disconnected therefrom, a plurality of subscribers' lines and an operator's cord circuit having a conjugate four-wire termination and a two-wire termination for connecting said channels to any of said lines at will.

16. A wireless telephone system comprising a transmitting antenna, a receiving antenna, a subscriber's station and an operator's station for connecting said subscriber's station to both of said antennæ, said operator's station comprising means to simulate the impedance of said subscriber's station when said subscriber's station is disconnected.

17. A wireless telephone system comprising a transmitting antenna, a receiving antenna, a transmission line and an operator's station for connecting said transmission line to both of said antennæ, said operator's station comprising a network simulating the characteristic impedance of said transmission line.

18. In combination, two separated stations, two central operators' stations associated respectively with said separated stations by signal lines, an asymmetric channel for transmitting electrical waves in one direction between said central stations, a separate asymmetric channel for transmitting electric waves in the opposite direction between said central stations, and an operator's cord circuit at each central station for conjugately connecting the two asymmetric channels at said central station to the associated signal line at will.

19. In a signaling system, two separated stations, two asymmetric channels connecting said stations, each of said channels comprising means for producing high frequency carrier currents, means for modulating said currents in accordance with signaling currents, a circuit for transmitting low frequency signal currents from one of said stations to its associated modulator, means for detecting the modulated high frequency currents, a circuit for transmitting the low frequency detected currents to the other of said stations, a two-way signaling line and an operator's cord circuit having means for conjugately connecting the terminals of the two asymmetric channels at one of said stations to said two-way signaling line.

20. In a signaling system, two separated stations, two asymmetric channels connecting said stations, each of said channels comprising means for producing high frequency carrier currents, means for modulating said carrier currents in accordance with signal currents, a transmitting antenna for radiating the energy of said carrier currents and a receiving antenna for receiving said radiated energy, a circuit for transmitting low frequency signal currents from one of said stations to its associated modulator, means for detecting high frequency currents, a circuit for transmitting the low frequency detected currents to the other of said stations, a two-way signaling line, and an operator's cord circuit having means for conjugately connecting the terminals of the two asymmetric channels at one of said stations to said two-way signaling line.

21. In combination, a plurality of widely separated radio transmission stations, a plurality of widely separated radial receiving stations, a plurality of subscribers' stations and means whereby a central station operator may connect any of said subscribers' stations simultaneously to any of said radio transmitting stations and any of said radio receiving stations.

22. In combination, a central station, physically separate high frequency incoming and outgoing channels terminating thereat, a subscriber's station, a line connected to said subscriber's station and terminating at said central station, an operator's circuit at said central station whereby an operator may converse either over said channels or over said line, and an operator's cord circuit for conjugately connecting said channels to said line at will.

23. In a signaling system, a radio transmitter and radio receiver having connections leading to a common point, a plurality of wire communication channels connected to said point, link circuits for interconnecting any wire communicating channel with the radio transmitter and receiver, and means associated with said link circuits for enabling the operator to talk and listen either on the radio circuit or on the wire circuit.

24. In a signaling system, a radio transmitter and radio receiver having connections leading to a common point, a plurality of wire communication channels connected to said point, link circuits for interconnecting any wire communication channel with the radio transmitter and receiver, and means associated with said link circuits for permitting the operator to monitor the connection without interrupting it.

25. In a signaling system a radio transmitter and radio receiver having connections leading to a common point, a plurality of wire communication channels connected to said point, link circuits for interconnecting any wire communicating channel with the radio transmitter and receiver, and switching means associated with said link circuits to enable the operator's set including the transmitter and receiver to be connected with the wire circuit or the radio circuits independently.

26. In a signaling system a radio transmitter and radio receiver having connections leading to a common point a plurality of wire communication channels connected to said point, link circuits for interconnecting any wire communicating channel with the radio transmitter and receiver, and switching means associated with said link circuits for enabling the operator's set including transmitter and receiver to be connected independently either to the wire or radio part of the system and to permit the receiver to be associated with the connection between the radio and wire part of the system without interrupting it.

In witness whereof, I hereunto subscribe my name this 19th day of May, A. D. 1923.

HERBERT E. SHREEVE.